United States Patent
Kim et al.

(10) Patent No.: US 8,239,596 B2
(45) Date of Patent: Aug. 7, 2012

(54) IC CARD, TERMINAL WITH IC CARD AND INITIALIZING METHOD THEREOF

(75) Inventors: Kyoung-Tae Kim, Seoul (KR); Min-Jeong Kim, Seoul (KR); Jun-Chae Na, Seoul (KR)

(73) Assignee: KT Corporation, Gyeonggi-do (KR)

( * ) Notice: Subject to any disclaimer, the term of this patent is extended or adjusted under 35 U.S.C. 154(b) by 402 days.

(21) Appl. No.: 12/190,518

(22) Filed: Aug. 12, 2008

(65) Prior Publication Data

US 2008/0320187 A1 Dec. 25, 2008

Related U.S. Application Data

(63) Continuation of application No. PCT/KR2007/000806, filed on Feb. 15, 2007.

(30) Foreign Application Priority Data

Feb. 17, 2006  (KR) .................. 10-2006-0015773
Feb. 17, 2006  (KR) .................. 10-2006-0015786

(51) Int. Cl.
*G06F 13/42* (2006.01)
*G06F 13/00* (2006.01)

(52) U.S. Cl. ........ 710/106; 710/100; 710/104; 710/105; 710/316

(58) Field of Classification Search .................. 710/100, 710/104–106, 316
See application file for complete search history.

(56) References Cited

U.S. PATENT DOCUMENTS

| | | | |
|---|---|---|---|
| 4,909,742 A * | 3/1990 | Ohkubo et al. | 439/59 |
| 5,386,539 A * | 1/1995 | Nishi | 711/115 |
| 5,877,975 A * | 3/1999 | Jigour et al. | 365/52 |
| 6,439,464 B1 * | 8/2002 | Fruhauf et al. | 235/492 |
| 6,581,122 B1 * | 6/2003 | Sarat | 710/301 |

(Continued)

FOREIGN PATENT DOCUMENTS

EP    1320066 A2 *  6/2003

(Continued)

OTHER PUBLICATIONS

Da Guo; Min Lin; Jun Liao; , "A study of Telecom application services based on Smart Card," Web Society (SWS), 2010 IEEE 2nd Symposium on , pp. 705-707, Aug. 16-17, 2010.*

(Continued)

*Primary Examiner* — Faisal M Zaman
(74) *Attorney, Agent, or Firm* — IP Legal Services, LLC

(57) ABSTRACT

An IC card and a terminal mounted with an IC card are disclosed. In one embodiment, the IC card includes i) a memory, ii) a plurality of contacts including a pair of RF contacts and at least one communication contact, a micro processor, selecting any one of a low speed communication protocol and a high speed communication protocol, processing data written in the memory by a command inputted through any one of the RF contact and the communication contact determined by the selected communication protocol, and outputting a corresponding response, iii) a high speed interface, communicating the command and the response through the communication contact by use of the high speed communication protocol, iv) a low speed interface, communicating the command and the response through the communication contact by use of the low speed communication protocol and v) a contact allotting unit, connecting the communication contact determined by the selected communication protocol to any one of the low speed interface and the high speed interface.

28 Claims, 11 Drawing Sheets

U.S. PATENT DOCUMENTS

| | | | |
|---|---|---|---|
| 6,631,137 B1* | 10/2003 | Lorrain et al. | 370/401 |
| 6,669,487 B1* | 12/2003 | Nishizawa et al. | 439/60 |
| 7,124,210 B1* | 10/2006 | Dinwiddie et al. | 710/16 |
| 7,337,966 B2* | 3/2008 | Ruping et al. | 235/441 |
| 7,395,973 B2* | 7/2008 | Ho | 235/492 |
| 7,594,603 B2* | 9/2009 | Tran | 235/380 |
| 7,631,348 B2* | 12/2009 | Villadiego et al. | 726/9 |
| 7,789,313 B2* | 9/2010 | Degauque et al. | 235/492 |
| 2004/0089717 A1* | 5/2004 | Harari et al. | 235/441 |
| 2005/0005045 A1* | 1/2005 | Kim et al. | 710/74 |
| 2005/0109841 A1* | 5/2005 | Ryan et al. | 235/380 |
| 2005/0197169 A1* | 9/2005 | Son | 455/572 |
| 2005/0198424 A1* | 9/2005 | Harari et al. | 710/301 |
| 2006/0095598 A1* | 5/2006 | Prevost et al. | 710/10 |
| 2006/0157563 A1* | 7/2006 | Marshall | 235/382 |
| 2006/0176146 A1* | 8/2006 | Krishan et al. | 340/5.53 |
| 2007/0145133 A1* | 6/2007 | Jolivet | 235/441 |
| 2007/0164118 A1* | 7/2007 | Degauque et al. | 235/492 |
| 2007/0186116 A1* | 8/2007 | Clemmensen et al. | 713/186 |
| 2007/0200003 A1* | 8/2007 | Deprun et al. | 235/492 |
| 2007/0210174 A1* | 9/2007 | Deprun et al. | 235/492 |
| 2008/0048042 A1* | 2/2008 | Degauque et al. | 235/492 |
| 2009/0043935 A1* | 2/2009 | Huomo et al. | 710/301 |
| 2010/0069039 A1* | 3/2010 | Kawamura et al. | 455/410 |
| 2011/0302342 A1* | 12/2011 | Singh et al. | 710/105 |

FOREIGN PATENT DOCUMENTS

| | | | |
|---|---|---|---|
| EP | 1895743 A1 * | 3/2008 | |
| EP | 2107511 A1 * | 10/2009 | |
| JP | 05135218 A * | 6/1993 | |
| JP | 2003-99739 | 4/2003 | |
| JP | 2004227455 A * | 8/2004 | |
| JP | 2007114991 A * | 5/2007 | |
| KR | 10-2005-0003960 | 1/2005 | |
| WO | WO 01/01340 A1 | 1/2001 | |
| WO | WO 01/84490 A1 | 11/2001 | |
| WO | WO 03046894 A1 * | 6/2003 | |

OTHER PUBLICATIONS

Qiang Xie; Shibao Zeng; Xiaojing Yu; , "A smart-card-based conditional access subsystem separation scheme for digital TV broadcasting," Consumer Electronics, IEEE Transactions on , vol. 51, No. 3, pp. 925-932, Aug. 2005.*

Patterson, H.; , "New Products," Microwave Magazine, IEEE , vol. 9, No. 5, pp. 166-169, Oct. 2008.*

Woongshik You; Jinhwan Lee; Yong Seong Cho; O-Hyung Kwon; Soo In Lee; Oh-Seok Kwon; , "Design and implementation of DCAS user terminal," Broadband Multimedia Systems and Broadcasting (BMSB), 2011 IEEE International Symposium on , pp. 1-5, Jun. 8-10, 2011.*

International Search Report for International Application No. PCT/KR2007/000806 dated May 25, 2007 by Korean Intellectual Property Office.

* cited by examiner

IC CARD, TERMINAL WITH IC CARD AND INITIALIZING METHOD THEREOF

RELATED APPLICATIONS

This application is a continuation application, and claims the benefit under 35 U.S.C. §§120 and 365 of PCT Application No. PCT/KR2007/000806, filed on Feb. 15, 2007, which is hereby incorporated by reference.

BACKGROUND OF THE INVENTION

The present invention is related to an integrated circuit (IC) card and a terminal mounted with an IC card, more specifically to a method of re-allotting a contact of an IC card according to the communication method.

SUMMARY OF CERTAIN INVENTIVE ASPECTS

One aspect of the present invention is an IC card and a terminal equipped with an IC card that support not only the contact high speed communication but also contactless wireless communication. The IC card can maintain pin arrangement according to the standard.

Another aspect of the present invention is a communication method between a terminal and an IC card in high speed communication.

Another aspect of the present invention is a communication method using a high speed interface in the communication for performing a function indigenous to the IC card.

Another aspect of the present invention is an IC card which can include a memory, a plurality of contacts including a pair of RF contacts and at least one communication contact, a microprocessor, selecting any one of a low speed communication protocol and a high speed communication protocol, processing data written in the memory by a command inputted through any one of the RF contact and the communication contact determined by the selected communication protocol, and outputting a corresponding response; a high speed interface, communicating the command and the response through the communication contact by use of the high speed communication protocol; a low speed interface, communicating the command and the response through the communication contact by use of the low speed communication protocol; and a contact allotting unit, connecting the communication contact determined by the selected communication protocol to any one of the low speed interface and the high speed interface.

Here, the plurality of contacts can be arranged in a form of being compatible with ISO 7816, and the communication contact can be C7 in the low speed communication protocol.

In the meantime, the high speed communication protocol is any one of a USB communication protocol and a multimedia card (MMC) protocol.

Also, the high speed interface can encapsulate the response correlated to the low speed communication protocol to a data token, compatible with the high speed communication protocol, and the high speed interface can decapsulate a data token, compatible with the high speed communication protocol, to the command correlated to the low speed communication protocol.

The microprocessor can insert, into an answer to reset (ATR), high speed communication protocol information supported in response to a reset signal (RST).

Here, the memory can include a flash memory. The contact allotting unit maintains a connection state corresponding to the low speed communication protocol in an initializing operation.

Another aspect of the present invention is a terminal equipped with an IC card, wherein the terminal can include an RF antenna; an IC card, equipped with a plurality of contacts including a pair of RF contacts and at least one communication contact, selectively supporting a low speed communication protocol and a high speed communication protocol, and determining the communication contact by the selected communication protocol; and an interface device, electrically connecting the RF contact and the RF antenna, and communicating with the IC card through the communication contact determined by the selected communication protocol.

Here, the communication protocol can be selected in an initializing operation between the IC card and the interface device, and the high speed communication protocol can be any one of a USB communication protocol and a multimedia card (MMC) protocol.

According to another embodiment of the present invention, a terminal can include an RF antenna; an IC card socket, being equipped with a plurality of contact ports including a pair of RF contact ports, coupled to the RF antenna, and at least one communication contact port corresponding to the communication contact of the IC card; a low speed interface, communicating with the IC card through the communication contact port by use of a low speed communication protocol; a high speed interface, communicating with the IC card through the communication contact port by use of a high speed communication protocol; and a contact port allotting unit, connecting the communication contact port to any one of the low speed interface and the high speed interface according to the selected communication protocol.

Here, the high speed interface can encapsulate a command to be transmitted to the IC card to a data token according to the high speed communication protocol, the command being connected to the low speed communication protocol, and the high speed interface can decapsulate a data token, received by the high speed communication protocol, to a response, correlated to the low speed communication protocol.

In the meantime, the contact port allotting unit maintains a connection state corresponding to the low speed communication protocol in an initializing operation.

Also, the low speed interface can check whether the IC card supports the high speed protocol, in an answer to reset (ATR) received in response to a reset signal (RST), and the low speed interface can control the contact port allotting unit to be connected to the high speed interface. Here, the high speed communication protocol can be operated by any one of a USB communication protocol and a multimedia card (MMC) protocol.

Also, the plurality of contact ports are arranged in a form of being compatible with ISO 7816, the communication contact port corresponds to a contact C7 of the IC card in the low speed communication protocol, and the communication contact port corresponds to contacts C6 and C7 of the IC card in the high speed communication protocol.

Another aspect of the present invention is an initializing method of the IC card, wherein the IC card includes a low speed interface and a high speed interface, the low speed interface communicating with a terminal by use of a low speed communication protocol and the high speed interface communicating with the terminal by use of a high speed communication protocol, and wherein the method can include receiving a reset signal (RST) from the terminal through the low speed interface; inserting, into an answer to reset (ATR) and transmitting to the terminal, high speed communication protocol information supported by the IC card through the low speed interface; and connecting the communication contact to any one of the low speed interface and the high speed interface by the response to the ATR.

Here, the response to the ATR, from the terminal, includes high speed communication protocol information supported by the terminal.

Also, the method can further include setting an answer time for the ATR; and maintaining the connection between the low speed interface and the communication contact if the answer time is exceeded.

The high speed communication information supported by the IC card is inserted into the lower bit of a $TD_i$ interface character of the ATR. The high speed communication protocol is any one of a USB communication protocol and a multimedia card (MMC) protocol.

Another aspect of the present invention is an initializing method of a terminal, the terminal including a low speed interface and a high speed interface, the low speed interface communicating with an IC card by use of a low speed communication protocol and the high speed interface communicating with the IC card by use of a high speed communication protocol, wherein the method includes transmitting a reset signal (RST) to the terminal through the low speed interface; extracting high speed communication protocol information supported by the IC card in an answer to reset (ATR) received through the low interface; transmitting a request of changing the communication protocol including the high speed communication protocol information supported by the IC card through the low speed interface; and connecting the communication contact to any one of the low speed interface and the high speed interface by a response to the request of changing the communication protocol.

Here, the high speed communication protocol can be any one of a USB communication protocol and a multimedia card (MMC) protocol. Specially, the initializing operation is preferably performed by the low speed communication protocol.

The high speed communication protocol information supported by the IC card can be inserted into the lower bit of a $TD_i$ interface character of the ATR, and the request of changing the communication protocol can further include information related to communication contacts to be used for communication by the high speed communication protocol.

Another aspect of the invention is an integrated circuit (IC) card, comprising: A) a memory, B) a plurality of contacts comprising a pair of radio frequency (RF) contacts and at least one communication contact, C) a microprocessor configured to i) select one of a low speed communication protocol and a high speed communication protocol, ii) process data written in the memory by a command input via one of 1) the RF contacts and 2) the at least one communication contact determined by the selected communication protocol, and iii) output a corresponding response, D) a high speed interface configured to communicate the command and the response via the at least one communication contact based on the high speed communication protocol, E) a low speed interface configured to communicate the command and the response via the at least one communication contact based on the low speed communication protocol and F) a contact allotting unit configured to electrically connect the communication contact determined by the selected communication protocol to one of the low speed interface and the high speed interface.

In the above IC card, the plurality of contacts may be arranged so as to be compatible with ISO 7816, and wherein the at least one communication contact may correspond to the C7 contact of ISO 7816 in the low speed communication protocol. In the above IC card, the plurality of contacts may be arranged so as to be compatible with ISO 7816, and wherein the at least one communication contact may correspond to the C6 and C7 contacts of ISO 7816 in the high speed communication protocol.

In the above IC card, the high speed communication protocol may be one of a universal serial bus (USB) communication protocol and a multimedia card (MMC) protocol. In the above IC card, the high speed interface may be further configured to encapsulate the response correlated to the low speed communication protocol to a data token, which is compatible with the high speed communication protocol. In the above IC card, the high speed interface may be further configured to decapsulate a data token, which is compatible with the high speed communication protocol, to the command correlated to the low speed communication protocol.

In the above IC card, the microprocessor may be further configured to insert high speed communication protocol information supported in response to a reset signal (RST) into an answer to reset (ATR). In the above IC card, the memory may comprise a flash memory. In the above IC card, the contact allotting unit may be further configured to maintain a connection state corresponding to the low speed communication protocol in an initializing operation.

Another aspect of the invention is a terminal, comprising: A) a radio frequency (RF) antenna, B) an integrated circuit (IC) card comprising a plurality of contacts, wherein the plurality of contacts comprise a pair of RF contacts and at least one communication contact wherein the IC card is configured to i) selectively support a low speed communication protocol or a high speed communication protocol, and ii) determine a communication contact based on the selected communication protocol and C) an interface device configured to i) electrically connect the RF contacts and the RF antenna, and ii) communicate with the IC card via the determined communication contact.

In the above terminal, the communication protocol may be selected in an initializing operation between the IC card and the interface device. In the above terminal, the high speed communication protocol may be one of a universal serial bus (USB) communication protocol and a multimedia card (MMC) protocol.

Another aspect of the invention is a terminal, comprising: A) a radio frequency (RF) antenna, B) an integrated circuit (IC) card comprising a plurality of contact ports and a pair of RF contact ports, wherein the IC card is coupled to the RF antenna, and wherein at least one communication contact port corresponds to the communication contact of the IC card, C) a low speed interface configured to communicate with the IC card via the at least one communication contact port based on a low speed communication protocol, D) a high speed interface configured to communicate with the IC card via the at least one communication contact port based on a high speed communication protocol and E) a contact port allotting unit configured to electrically connect the at least one communication contact port to one of the low speed interface and the high speed interface according to the selected communication protocol.

In the above terminal, the high speed interface may be further configured to encapsulate a command to be transmitted to the IC card to a data token according to the high speed communication protocol. In the above terminal, the high speed interface may be further configured to decapsulate a data token, received by the high speed communication protocol, to a response, which is correlated to the low speed communication protocol. In the above terminal, the contact port allotting unit may be further configured to maintain a connection state corresponding to the low speed communication protocol in an initializing operation.

In the above terminal, the low speed interface may be further configured to check whether the IC card supports the high speed protocol, in an answer to reset (ATR) received in response to a reset signal (RST). In the above terminal, the low speed interface may be further configured to control the contact port allotting unit to be connected to the high speed interface. In the above terminal, the high speed communication protocol may be operated by one of a universal serial bus (USB) communication protocol and a multimedia card (MMC) protocol. In the above terminal, the plurality of contact ports may be arranged so as to be compatible with ISO 7816, and wherein the at least one communication contact port may correspond to the C7 contact of ISO 7816 in the low speed communication protocol. In the above terminal, the plurality of contact ports may be arranged so as to be compatible with ISO 7816, and wherein the at least one communication contact port may correspond to the C6 and C7 contacts of ISO 7816 in the high speed communication protocol.

Another aspect of the invention is an initializing method of an integrated circuit (IC) card, the method comprising: A) providing an IC card which comprises a low speed interface and a high speed interface, wherein the low speed interface communicates with a terminal based on a low speed communication protocol, and wherein the high speed interface communicates with the terminal based on a high speed communication protocol, B) receiving a reset signal (RST) from the terminal via the low speed interface, C) incorporating high speed communication protocol information into an answer to reset (ATR), wherein the high speed communication protocol information is supported by the IC card via the low speed interface, D) transmitting the ATR to the terminal and E) electrically connecting the communication contact to one of the low speed interface and the high speed interface based on the response to the ATR.

In the above method, the response to the ATR, from the terminal, may comprise high speed communication protocol information supported by the terminal. The above method may further comprise: setting an answer time for the ATR and maintaining the connection between the low speed interface and the communication contact if the answer time is exceeded. In the above method, the high speed communication information supported by the IC card may be inserted into the lower bit of a $TD_i$ interface character of the ATR. In the above method, the high speed communication protocol may be one of a universal serial bus (USB) communication protocol and a multimedia card (MMC) protocol.

Another aspect of the invention is an initializing method of a terminal, the method comprising: A) transmitting a reset signal (RST) to a terminal via a low speed interface, wherein the IC card comprises the low speed interface and a high speed interface, wherein the low speed interface communicates with the terminal based on a low speed communication protocol, and wherein the high speed interface communicates with the terminal based on a high speed communication protocol, B) extracting high speed communication protocol information supported by the IC card in an answer to reset (ATR) received via the low interface, C) transmitting a request of changing the communication protocol including the high speed communication protocol information via the low speed interface and D) electrically connecting the communication contact to one of the low speed interface and the high speed interface based on a response to the request of changing the communication protocol.

In the above method, the high speed communication protocol may be one of a universal serial bus (USB) communication protocol and a multimedia card (MMC) protocol. In the above method, the initializing operation may be performed by the low speed communication protocol. In the above method, the high speed communication protocol information may be inserted into the lower bit of a $TD_i$ interface character of the ATR. In the above method, the request of changing the communication protocol may further comprise information related to communication contacts to be used for communication by the high speed communication protocol.

Still another aspect of the invention is an initializing apparatus for an integrated circuit (IC) card, the apparatus comprising: A) means for receiving a reset signal (RST) from a terminal via a low speed interface, wherein the IC card comprises a low speed interface and a high speed interface, wherein the low speed interface communicates with the terminal based on a low speed communication protocol, and wherein the high speed interface communicates with the terminal based on a high speed communication protocol, B) means for incorporating high speed communication protocol information into an answer to reset (ATR), wherein the high speed communication protocol information is supported by the IC card via the low speed interface, C) means for transmitting the ATR to the terminal and D) means for electrically connecting the communication contact to one of the low speed interface and the high speed interface based on the response to the ATR.

DETAILED DESCRIPTION OF CERTAIN INVENTIVE EMBODIMENTS

Figure 1:
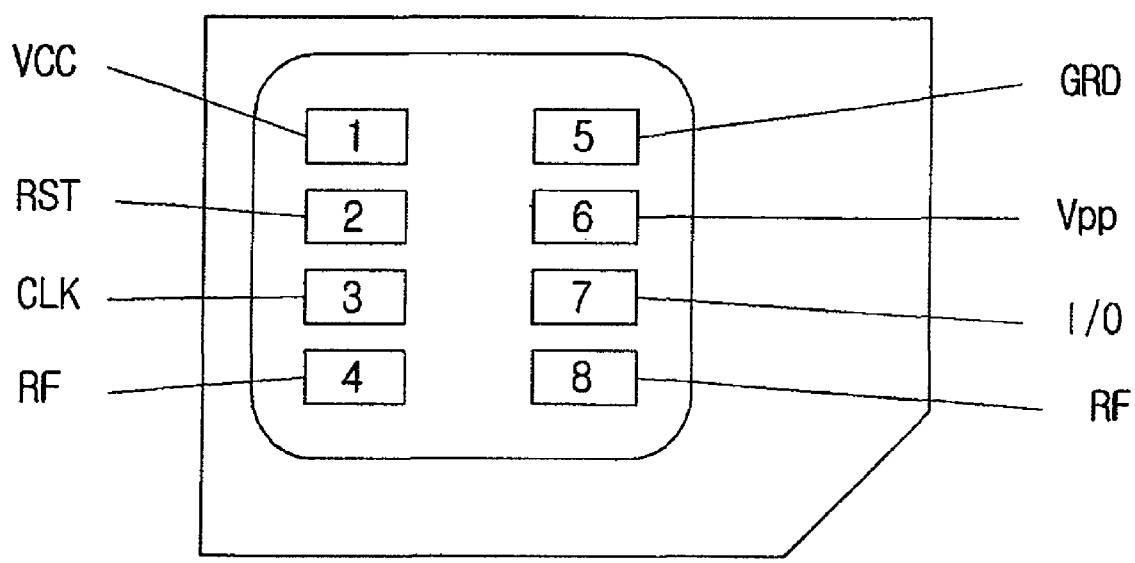
FIG. 1 illustrates the pin configuration of an IC card having an RF communication function.
Figure 2:
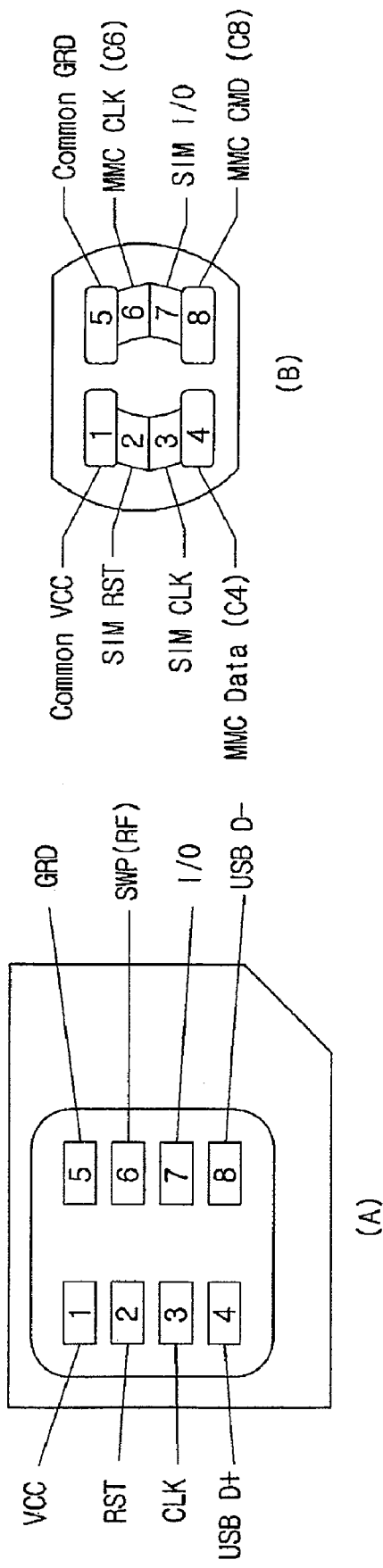
FIG. 2 illustrates the pin configuration of an IC card having a USB and an MMC interface.

FIG. 1 illustrates the pin configuration of a typical IC card having a radio frequency (RF) communication function, and FIG. 2 illustrates the pin configuration of an IC card having a universal serial bus (USB) and a multi-media card (MMC) interface. The typical IC chip could use contact and contactless communication as an IC chip by using one contact data pin and two RF pins among 8 pins defined by ISO-7816 (hereinafter, referred to as "8 ISO pins") as illustrated in FIG. 1.

As illustrated in FIG. 2, European telecommunications standards institute (ETSI) is in the process of standardization of a method for using 8 pins according to ISO-7816 to support the high speed communication (e.g. the USB in A of FIG. 2 or the MMC in B of FIG. 2) interface (hereinafter, referred to as I/F) in the case of contact communication. Table 1 and Table 2 show pin functions of IC chips applied with the USB I/F and the MMC I/F, respectively.

TABLE 1

| Pin | Function |
| --- | --- |
| C1 | Vcc |
| C2 | RST |
| C3 | CLK |
| C4 | USB D+ |
| C5 | GRD |
| C6 | SWP(RF) or Vpp |
| C7 | I/O |
| C8 | USB D− |

A pin C1 receives a supply voltage requested for the driving of the IC chip, and another pin C2 receives a reset signal (RST). Another signal pin C3 receives a clock signal (CLK). Another pin C5 receives a ground signal (GRD). Another pin C6 receives a wireless single wire protocol (SWP) signal or a variable supply voltage. Another pin C7 is a contact for data input/output. Here, in the case of an IC chip supporting the near field communication such as a traffic card, the pin C6 for the wireless SWP is a contact for communicating with a near field communication module equipped outside of the IC chip. The near field communication uses a local channel of 13.56 MHz, such as infrared rays (IR) or Bluetooth. The other pins C4 and C8 are contacts for the USB I/F.

TABLE 2

| Pin | Function |
| --- | --- |
| C1 | Common Vcc |
| C2 | SIM RST(Reset) |
| C3 | SIM CLK(Clock) |
| C4 | MMC Data |
| C5 | Common GRD(Ground) |
| C6 | MMC CLK(Clock) |
| C7 | SIM I/O |
| C8 | MMC CMD(Command) |

A pin C1 receives a supply voltage requested for the driving of the IC chip, and another pin C2 receives a reset signal (RST). Another pin C3 receives a clock signal (CLK) requested for the driving of the IC chip. Another pin C5 is a contact for a common ground reference voltage (GRD). Another pin C6 receives a clock signal for the MMC I/F. Another pin C7 is a contact for data input/output. The other pins C4 and C8 are contacts for the MMC I/F.

However, since the MMC I/F or the USB I/F using the currently designed 8 pins does not have two spare contacts for the RF, neither is able to support the contact and contactless communication at the same time.

Hereinafter, some embodiments of the present invention will be described with reference to the accompanying drawings. Although the below description is based on an embodiment applied with an MMC communication protocol, the technological spirit of the present invention supports a high speed communication protocol between an IC card and a terminal. For this, in the case of changing a communication contact, it shall be evident that the high speed communication protocol can be applied to embodiments of the present invention without restriction of protocol types.

Figure 3:
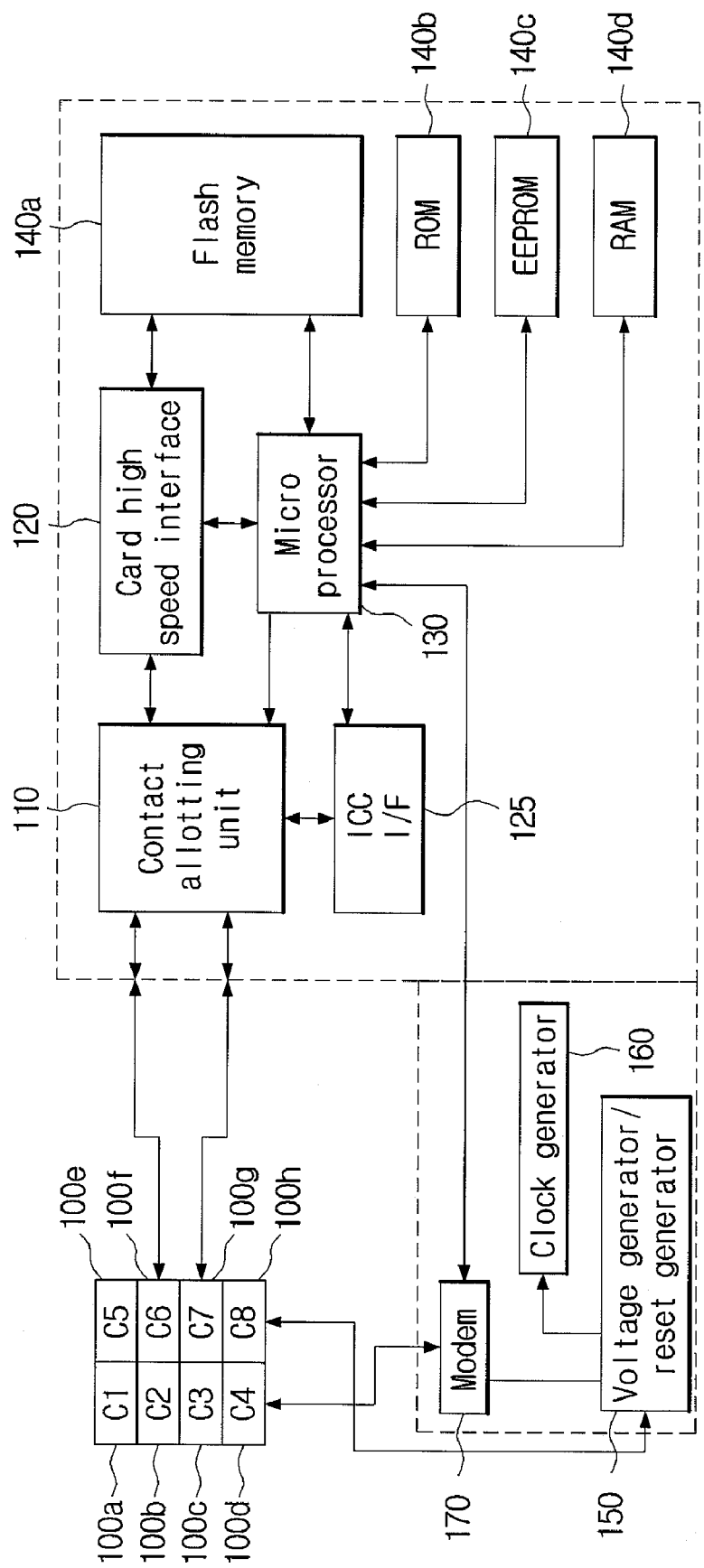
FIG. 3 is block diagram illustrating an IC card in accordance with an embodiment of the present invention.

FIG. 3 is block diagram illustrating an IC card in accordance with an embodiment of the present invention. The IC card may have contact communication with the terminal according to the ISO 7816 standard and contactless communication with an external terminal (e.g. an automated teller machine (ATM)) according to the ISO-14443 standard. Also, the IC card may include a solid memory element such as a flash memory. The IC card can communicate with the outside through a terminal high speed interface. In addition, the IC card can be any one of an IC chip for identifying a mobile communication subscriber, such as a subscriber identity module (SIM), a universal subscriber identity module (USIM), a user identity module (UIM) and a removable user identity module (R-UIM), and another IC card for electronic commerce, such as a finance chip.

The IC card in accordance with an embodiment of the present invention functions as not only a smart card identifying the mobile communication subscriber and performing the authentication/payment operation in the electronic commerce but also an external storage device of the terminal with use of the solid memory element. For identification, the operation as a smart card is referred to as a basic operation, and the operation as an external storage device is referred to as an expanded operation.

The terminal, which accommodates the IC card, includes an interface device (IFD) communicating with the accommodated IC card and an RF antenna. Here, the terminal includes a mobile communication terminal such as a cellular phone. The interface device satisfies ISO-10373 as the physical test standard of ID-1 and an electrical interoperability with an IC card electrically requested in ISO 7816-3. Also, the interface device has high speed communication with the IC card. The interface device includes an IC card socket accommodating the IC card arranged with a plurality of contact ports on locations corresponding to the contacts of the IC card. A pair of contact ports, electrically connected to the contacts C4 and C8, of contact ports are coupled to an RF antenna. Preferably, the RF antenna is a roof antenna or a micro-strip line antenna. Also, the interface device includes an IC card reader, exchanging an APDU according to the ISO 7816 standard with the IC card, and a terminal high speed interface, exchanging high speed communication data. Hereinafter, the communication method by exchanging the APDU between the terminal and the IC card, in accordance with ISO 7816 will be referred to as a low speed communication protocol. Also, the communication method exchanging a token/packet by using a communication protocol such as a USB or an MMC will be referred to as the high speed communication protocol. Here, it must be considered that the low speed communication protocol includes the performance of the basic operation of the IC card as well as the communication method. Similarly, it must be considered that the high speed communication protocol includes the performance of the expanded operation of the IC card as well as the communication method.

On the surface of the IC card is located a metal pad formed with a plurality of contacts 100a through 100h. The number and the layout of the plurality of contacts 100a through 100h are based on the ISO 7816 standard. In this embodiment of the present invention, the contacts C1, C2, C3, C5, C6 and C7 are used for the contact operation, receiving a signal from the terminal and performing a necessary process, and the other contacts C4 and C8 are used for the contactless operation, receiving a signal from an external terminal and performing a necessary process. In one embodiment of the present invention, since the initializing operation allows the IC card to function as a different communication protocol, the function of each contact is determined depending on the initializing operation.

TABLE 3

| Pin | Function |
| --- | --- |
| C1 | Vcc |
| C2 | RST |
| C3 | CLK |
| C4 | RF |
| C5 | GRD |
| C6 | Vpp |
| C7 | I/O |
| C8 | RF |

Table 3 shows the function of each contact of the IC card functioning as the low speed communication protocol in the terminal that does not support the high speed communication protocol by the initializing operation. A contact C1 100a receives a supply voltage requested for the driving of an IC chip. Another contact C2 100b receives a reset signal. Another contact C3 100c receives a clock signal requested for the driving of the IC chip. Another contact C5 100e receives a ground reference voltage. Another contact C6 100f receives a programming voltage Vpp. Another contact C7 100g is a communication contact for data input/output in the low speed communication. The other contacts C4 and C8 100d and 100h are RF contacts for the wireless communication through an RF antenna included inside the terminal.

TABLE 4

| Pin | Function |
| --- | --- |
| C1 | Vcc |
| C2 | RST |
| C3 | CLK |
| C4 | RF |
| C5 | GRD |
| C6 | High speed communication |
| C7 | High speed communication |
| C8 | RF |

Table 4 shows the function of each contact of the IC card operated in the terminal that supports the high speed communication protocol. A contact C1 100a receives a supply voltage requested for the driving of the IC chip. Another contact C2 100b receives a reset signal. Another contact C3 100c receives a clock signal requested for the driving of the IC chip. Another contact C5 110e receives a ground reference voltage. Contacts C6 and C7 100f and 100g are communication contacts for the high speed communication. The other contacts C4 and C8 100d and 100h are RF contacts for the wireless communication through an RF antenna included inside the terminal. In the embodiment of the present invention, the reference clock for driving the IC card, applied through the contact C3 100c, is also used for the operation by using the high speed communication protocol. Typically, the IC card has the reference clock of 1 to 5 MHz, and the MMC protocol has the reference clock of zero to 20 MHz.

A contact allotting unit 110 is coupled to the data input/output port of a card high speed interface 120 and the data input/output port of an IC card interface 125, respectively. Also, the initializing process allows the communication pin to be connected to the card high speed interface 120 or the IC card interface 125. The operation of changing the connection state of the contact allotting unit 110 is performed by the control of a micro processor 130. When operated by using the low speed communication protocol, since the data input/output is possible through one contact, the communication contact is C7. When operated by using the high speed communication protocol, since the communication is typically performed through two contacts, the communication contacts are C6 and C7. For example, the USB protocol requests contacts for inputting and outputting a DP signal and a DM signal, and the MMC protocol requests contacts for inputting and outputting a command (CMD) or data (DAT).

Figure 4:
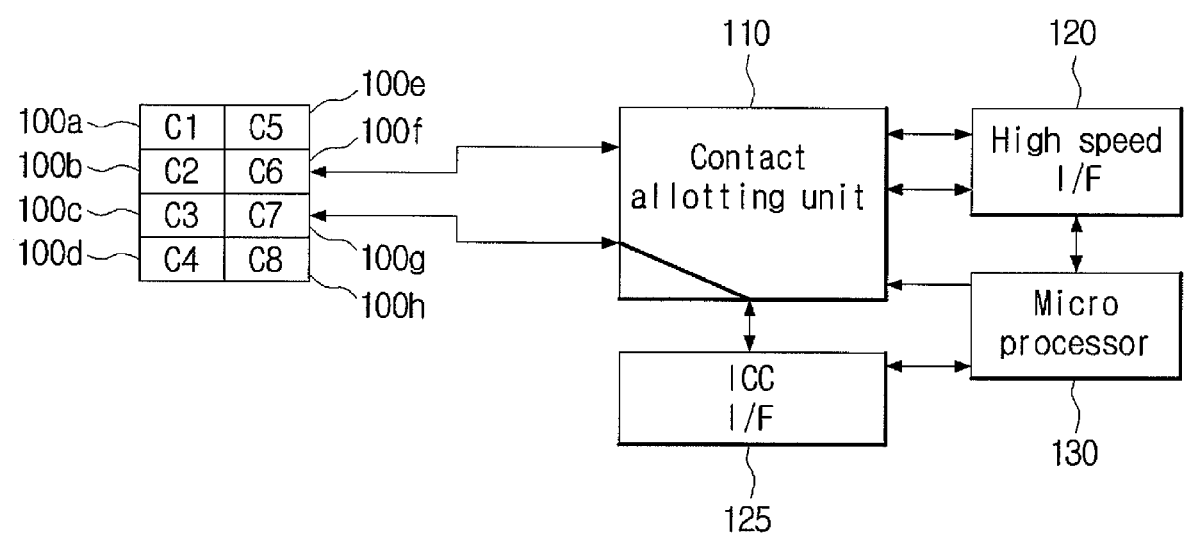
FIG. 4 is an example illustrating the communication contact connection state when a low speed communication protocol is selected in accordance with an embodiment of the present invention.
Figure 5:
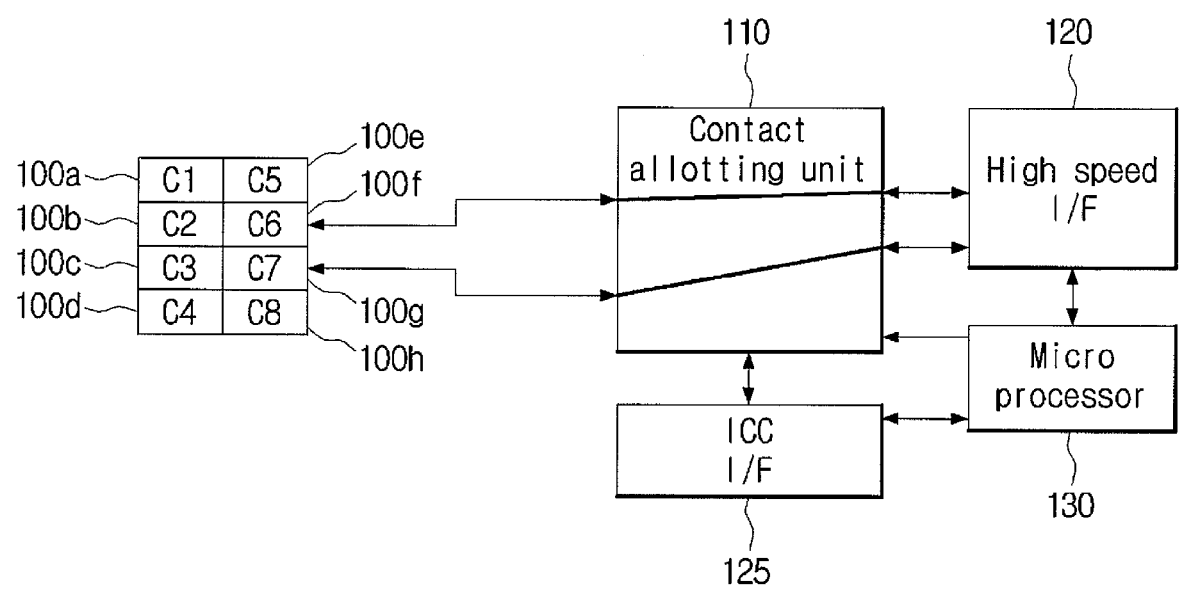
FIG. 5 is an example illustrating the communication contact connection state when a high speed communication protocol is selected in accordance with an embodiment of the present invention.

Referring to FIG. 4 and FIG. 5, the operation of changing the connection state of the contact allotting unit 110 through the initializing process will be briefly described. In the initialization, the contact allotting unit 110 is basically connected to the IC card interface 125. Once the IC card is inputted into the terminal, the terminal recognizes the inserted IC card and applies a reset signal (RST) to the contact C2 of the IC card, to start the initializing process. In response to the reset signal, the IC card transmits an answer to reset (ATR) to the terminal. After the initializing process between the micro processor 130 and the terminal, if the terminal is recognized as the terminal supporting the high speed protocol, the contact allotting unit 110 is disconnected from the micro processor 130 and is connected to a card high speed interface 120, thereby being capable of communicating between the terminal and the IC card by using the high speed communication protocol (refer to FIG. 5). If the terminal is recognized as the terminal that does not support the high speed communication protocol, the contact allotting unit 110 maintains the connection with the IC interface 125 to allow the terminal and the IC card to communicate each other by using the low speed communication protocol (refer to FIG. 4)

The card high speed interface 120 is in charge of the high speed communication with the terminal. After the initializing process of the terminal supporting the high speed communication protocol, if the card high speed interface 120 is connected to the communication contacts C6 and C7 by the contact allotting unit 110, the response to a command from the terminal, outputted from the micro processor 130 and a flash memory 140a, is encapsulated to a high speed communication protocol format to transmit the response to the terminal, and the data or the command from the terminal is transferred to the flash memory 140a or the micro processor 130. In the embodiment, the card high speed interface 120 can perform the reading/writing of data of the flash memory 140a. The card high speed interface 120 supports any one communication protocol of the universal serial bus (USB) 1.1/2.0 and the multi-media card 3.31/4.1.

When communicating by using the low communication protocol, the IC card interface 125 performs the contact interface function to convert an application protocol data unit (APDU), outputted from the micro processor 130, into a transmission protocol data unit (TPDU) to transfer the TPDU through the connected communication contact and the TPDU, outputted from the terminal, into the APDU to transfer the APDU to the micro processor 130.

The micro processor 130 performs the basic operation of the IC card according to a command from the terminal. In the initialization of the IC card, the micro processor 130 determines the communication protocol through protocol negotiation with the terminal and controls the contact allotting unit 110 such that the communication with the terminal can be performed through the card high speed interface 120. In other words, the micro processor 130 changes the contact connection of the contact allotting unit 110 through the initializing process of the terminal and generates a response-APDU (R-APDU) in response to a command from the terminal, that is, a command APDU (C-APDU) to transmit the R-APDU to the terminal. The basic operation of the IC card is varied depending on the usage of the IC card (the IC card for the communication terminal or the electronic commerce) and the operation mode (contact mode or contactless mode). Since the basic operation of the IC card according to the usage and the operation mode is a known technology, the pertinent detailed description will be omitted. A ROM 140b, an EEPROM 140c and a RAM 140d, connected to the micro processor 130, are memories necessary for the basic operation of the IC card.

The wireless interface for the contactless operation includes a voltage generator/reset generator 150, a clock generator and a modem. If the wireless interface is inserted into the terminal regardless of whether the initialization is performed, the wireless interface is coupled to an RF antenna through the RF contacts C4 and C8 100d and 100h. The voltage generator/reset generator 150 receives a wireless signal transmitted from a contactless terminal (interrogator) and generates power necessary for the operation of the IC card. Also, the voltage generator/reset generator 150 applies the reset signal to the micro processor 130 to allow the IC card to perform the contactless operation. Meanwhile, the clock generator 160 generates a driving clock necessary for the operation of the IC card by the power supplied from the voltage generator/reset generator 150. The modem 170 wirelessly receives data or a command from the contactless terminal and transfers the data or the command to the micro processor 130. Also, the modem 170 receives a corresponding response from the micro processor 130 and transmits the response to the contactless terminal.

The flash memory 140a is a non-volatile memory module independently operated by the data writing/reading command from the terminal. In another embodiment, the flash memory 140a consists of a memory cell array, storing data, and a row-column selector, addressing each memory cell for the data writing/reading operation only. The operation of controlling these according to the data writing/reading operation command can be carried out by the card high speed interface 120.

Figure 6:
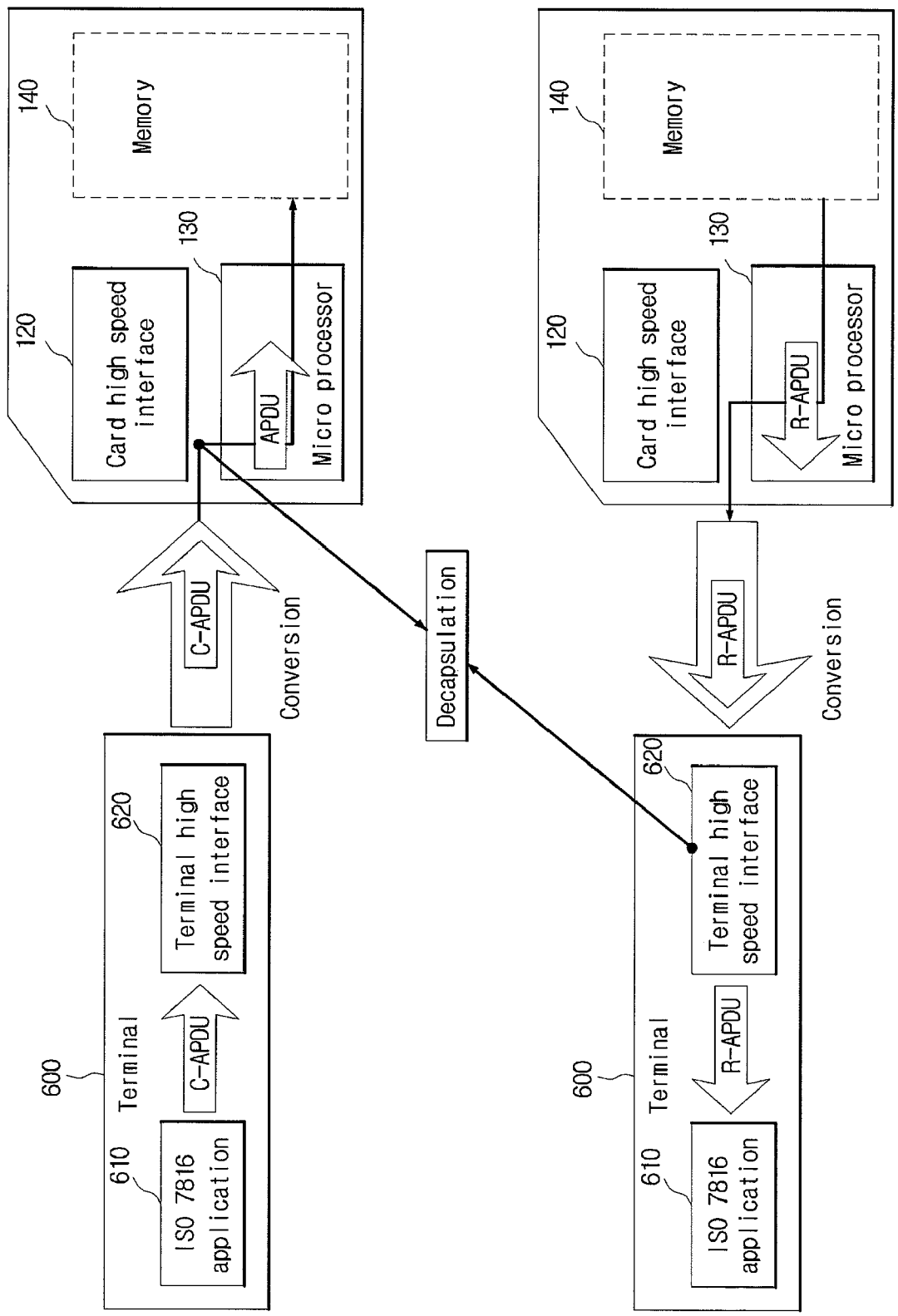
FIG. 6 is an example illustrating a communication method between a terminal and an IC card in accordance with an embodiment of the present invention.
Figure 7:
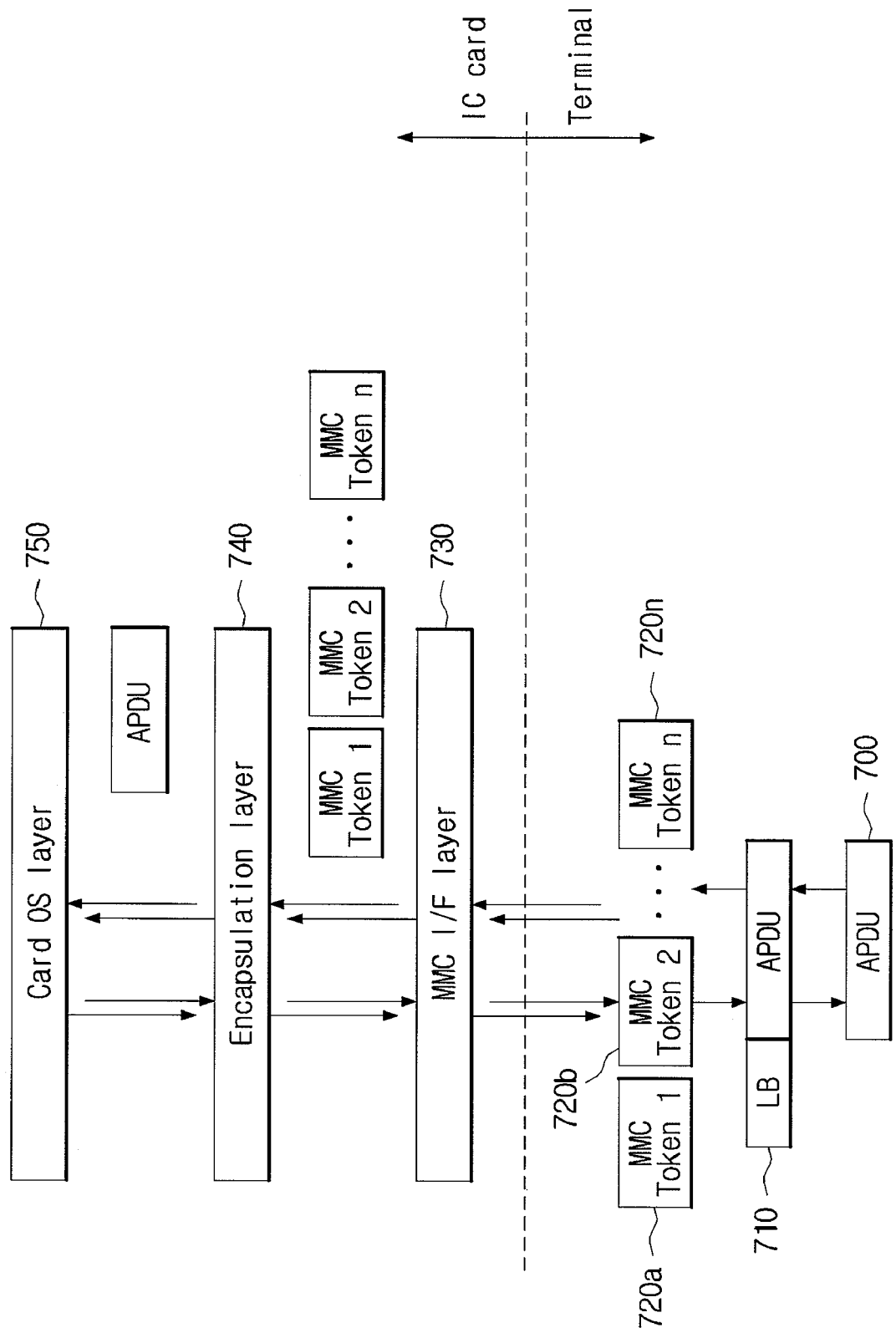
FIG. 7 is an example illustrating data per layer in accordance with an embodiment of the present invention.
Figure 8:
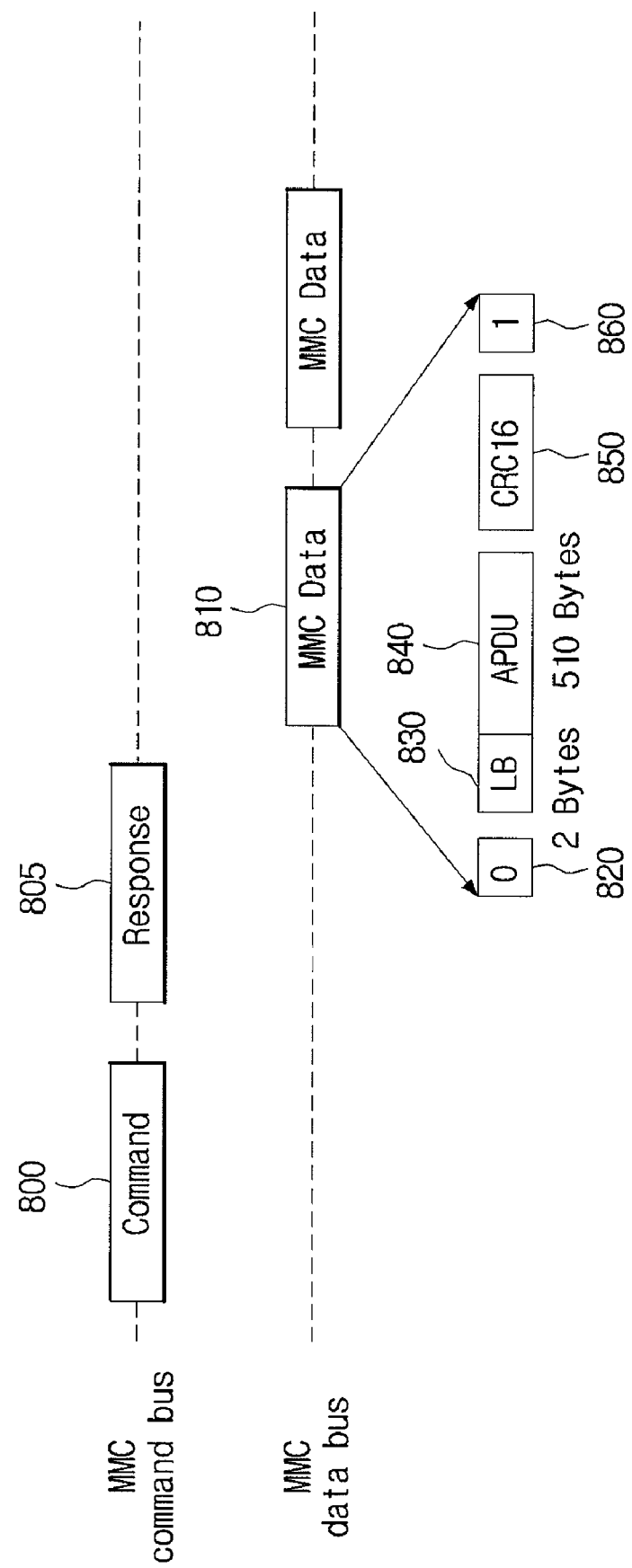
FIG. 8 illustrates an MMC bus protocol as a high speed communication protocol in accordance with an embodiment of the present invention.

FIG. 6 is an example illustrating a communication method between the terminal and the IC card in accordance with an embodiment of the present invention, and FIG. 7 is an example illustrating data type per layer. FIG. 8 illustrates the MMC bus protocol as the high speed communication protocol. This embodiment of the present invention assumes that the terminal receives an APDU to perform the function indigenous to the IC card by the high speed communication protocol. Since the IC card applied with the USB communication method and the operation method thereof has already been well-known, the below description will be related to the case of using the MMC protocol only as the high speed communication protocol, for example.

The communication between the terminal and the IC card, for the basic operation of the IC card, is performed by the APDU according to the ISO 7816 standard. However, after the high speed communication protocol is selected, the micro processor 130 and the terminal must communicate the data with each other through the card high speed interface 120. Accordingly, the encapsulating and decapsulating operations of the APDU to a format suitable for the high speed communication protocol are performed between an ISO 7816 application 610 and the micro processor 130 of the IC card.

In other words, when operated by using the low speed communication protocol, the IC card can perform the basic process only. The IC card is not able to perform the expanded process. However, when operated by using the high speed communication protocol, the IC card can perform not only the basic process but also the expanded process. When operated by using the high speed communication protocol, the command and the response thereof, necessary to perform the basic process, are inserted into the token/packet, generated by the high speed protocol, and changed between the terminal and the IC card. This will be described below in detail.

The C-APDU, which is the command outputted from the ISO 7816 application 610 of the terminal 600, is encapsulated to a series of token by the terminal high speed interface 620. The encapsulated series of token is transferred to the card high speed interface 120 through physically connected contact. The card high speed interface 120 decapsulates the series of token to the C-APDU to transfer the decapsulated C-APDU to the micro processor 130. The micro processor 130 performs the corresponding operation with reference to the memories 140b, 140c, and 140d according to the C-APDU and generates the R-APDU in response to the performed result.

The R-APDU outputted from the micro processor 130 is encapsulated to the series of token in the card high speed interface 120 and transferred to the terminal high speed interface 620 of the terminal 600 through the physically connected contact. The terminal high speed interface 620 decapsulates the series of token to the R-APDU and transfers the decapsulated R-APDU to the ISO 7816 application.

In detail, the APDU generated by the ISO 7816 application 610 consists of a header of 4 bytes and a body of variable length. The header consists of a class of instruction (CLA) of 1 byte, an instruction code (INS) of 1 byte, a parameter 1 (P1) of 1 byte and a parameter 2 (P2) of 1 byte. The body consists of Lc of 1 byte, measuring an optional body or the length of data field; the data field, including a command parameter of variable length or data; and Le of 1 byte, estimating the expected length of return data.

The terminal high speed interface 620 couples the APDU, generated by the ISO 7816 application 610, to an LB header 710 measuring the APDU, and then, encapsulates it to a plurality of MMC tokens 720a through 720n

The encapsulated plurality of MMC tokens 720a through 720n are transferred to the card high speed interface 120 of the IC card through an MMC I/F layer formed between the high speed interface 620 of the terminal, supporting the MMC protocol, and the card high speed interface 120 of the IC card. The card high speed interface 120, located in the MMC I/F layer, receives the plurality of MMC tokens 720a through 720n. Then, the card high speed interface 120 decapsulates the plurality of MMC tokens 720a through 720n to the APDU with reference to the LB header value at an encapsulation layer 740 as the upper layer of the MMC I/F layer, located on the card high speed interface 120. The decapsulated APDU is processed in a card OS layer located on the micro processor 130.

The process of transferring the APDU, generated in the card OS layer 750, to the terminal ISO 7816 application is applied as the inverse of the transmitting process from the terminal. The APDU generated in the card OS layer 750, which is the optional body of variable length, includes a data field and state words SW1 and SW2.

In short, in the case of selecting the high speed communication protocol, the card high speed interface encapsulates the APDU to at least one token to communicate the APDU, replacing that the IC card interface, which performs the conversion according to ISO 7816 between the terminal and the IC card interface, converts the APDU into a transmission protocol data unit (TPDU). Hereinafter, the operation using the high speed communication by the MMC protocol will be described in detail with reference to FIG. 8.

In the case of the MMC protocol, a command token 800 and a data token 810, correlated to the command token, are respectively communicated through separate lines. A data reading/writing command (from the terminal to the IC card) and the corresponding response (from the IC card to the terminal) are received and transmitted through the communication contact C7, and the data according to the command are received and transmitted through the communication contact C6. In the MMC protocol, the data reading/writing command is classified into a sequential command and a block-oriented command. The sequential command transmits a successive data stream, and the transmission of the successive data stream is maintained until a stop command appears in the communication contact C7. The block-oriented command transmits a successive block (token) including cyclic redundancy checking (CRC), and the block is continuously transmitted until the stop command appears in the communication contact C7. Here, the command is transmitted from the terminal to the IC card, and the response is transmitted from the IC card to the terminal. The data is transmitted between the terminal and the IC card.

The command token 800 has the overall length of 48 bits. A start bit and an end bit are always 0 and 1, respectively. A transmitter bit next to the start bit, having 1, is a bit representing the command from the terminal. A command content is next to the transmitter bit and protected by a CNC checksum bit of 7 bits.

A response token 805 has the overall length of 48 bits or 136 bits. A start bit and an end bit are always 0 and 1, respectively. A transmitter bit next to the start bit, having 0, is a bit representing the response from the IC card. A response content is next to the transmitter bit and protected by the CNC checksum bit of 7 bit.

In the block-oriented data token 810, a start bit 820 and an end bit 860 are always 0 and 1, respectively. The block-oriented data token 810, which has the length of the other part of 512 bytes except for the start bit 820, the end bit 860 and a CNC checksum bit 850, consists of an LB field 830 of 2 bytes, representing the length of the APDU, and an APDU field 840 of 510 bytes. The APDU field 840 includes a C-APDU or an RAPDU from the terminal or the IC card. The APDU exceeding 510 bytes is divided into at least 2 block-oriented data tokens 810 and is transmitted. "00h" is inserted into the unfilled remaining byte in the last block-oriented data token 810.

The transmission of the C-APDU from the terminal to the IC card and the transmission of the R-APDU from the IC card to the terminal, by use of the MMC protocol, can be performed by allowing the terminal to successively carry out the writing operation (the transmission of the C-APDU) and the reading operation (the transmission of the R-APDU).

The method of communicating the APDU will be described in detail. If the ISO 7816 application provides the C-APDU, the terminal's terminal high speed interface generates a first command token for the writing operation to transmit the first command token to the IC card through a command bus and receives a corresponding first response token through a data bus. If the first response token is received, the terminal high speed interface transmits the C-APDU to the IC card through the data bus. If the transmission of the data token of the C-APDU is completed, the terminal high speed interface transmits a stop command token to the IC card and receives a corresponding response token. After receiving the response token corresponding to the stop command token, the terminal high speed interface, with a time lag, transmits a second command token for the reading operation to the IC card through the command bus. Here, the second command token can include information capable of identifying the reading operation for transmitting the result of the operation performed by the IC card according to the first command.

The terminal's card high speed interface, which has received the second command token, transmits a corresponding second response token. Then, the IC card encapsulates the R-APDU to block-oriented data tokens and transmits the tokens to the terminal through the data bus. If the transmission of the data token of the R-APDU is completed, the terminal high speed interface transmits the stop command token to the IC card and receives the corresponding response token.

Figure 9:
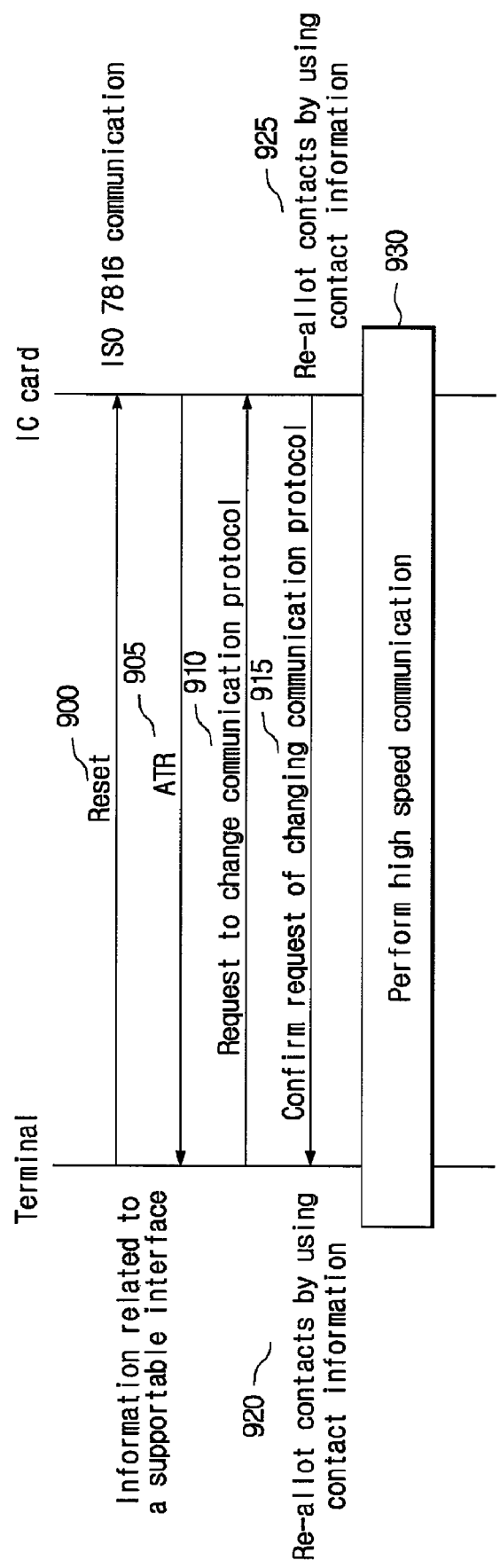
FIG. 9 is a flow chart illustrating an initializing operation in accordance with an embodiment of the present invention.
Figure 10:
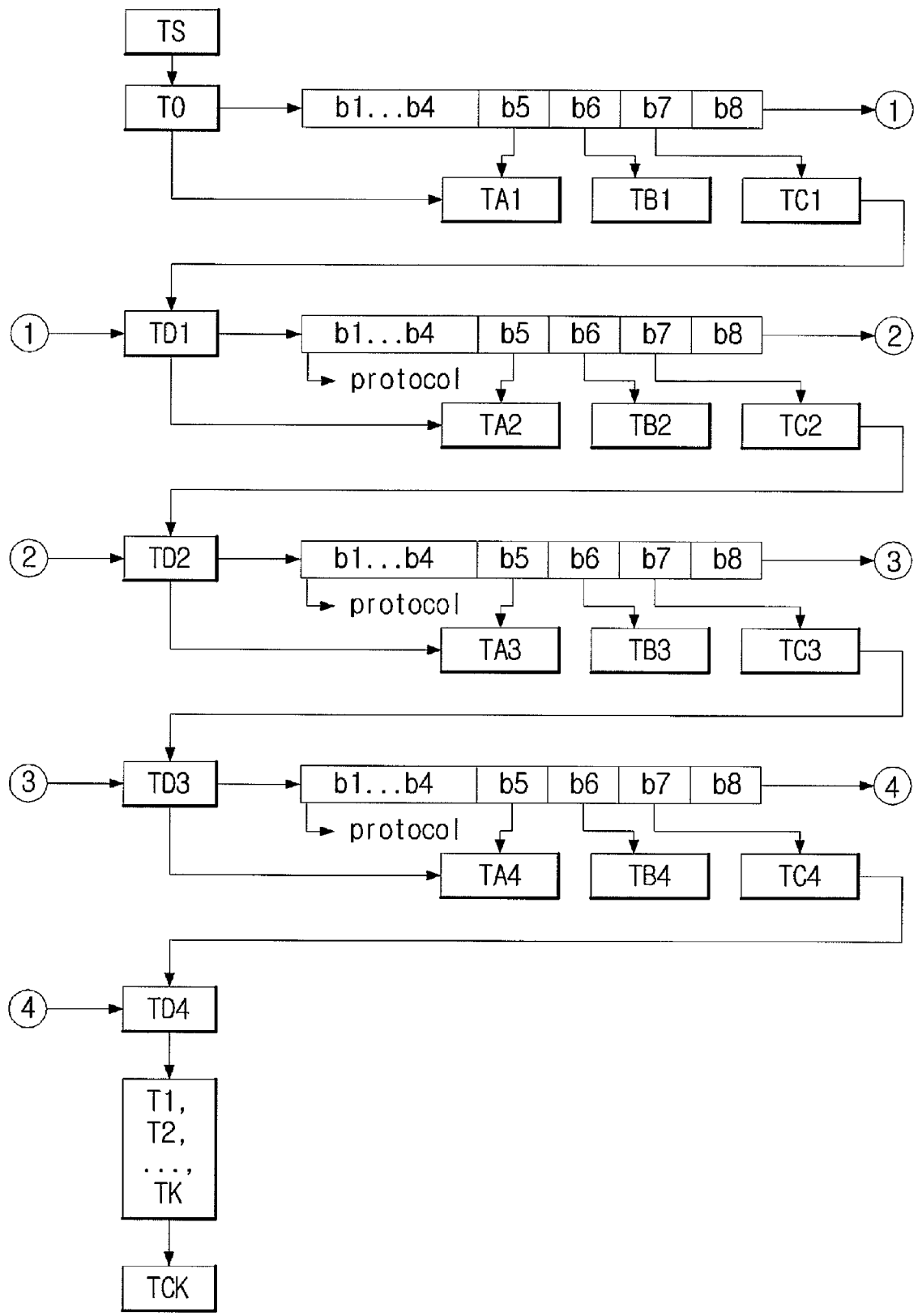
FIG. 10 illustrates the structure of answer to reset (ATR) for setting a high speed communication protocol in accordance with an embodiment of the present invention.

FIG. 9 is a flow chart illustrating an initializing operation in accordance with an embodiment of the present invention, and FIG. 10 illustrates the structure of answer to reset for setting the high speed communication protocol.

In a step represented by 900, if the IC card is inserted into the terminal, the terminal's interface device recognizes the insertion of the IC card and applies a reset signal to the IC card through the contact C7.

In a step represented by 905, if the reset signal is received, the micro processor of the IC card inserts information related to a supportable high speed communication protocol into answer to reset (ATR) information and applies it to the terminal through the contact C7. An ATR refers to information in units of a series of bytes including basic information related to the high speed communication protocol in response to the IC card for the reset signal of the interface device. Each of the byte is transferred in a form of asynchronous characters through the communication contact C7. If the reset operation is successfully performed, the IC card transfers an initial character (TS), having the same structure as FIG. 10, followed by 32 characters at the maximum, to the interface device through the communication contact C7. Here, the coding method and the structure of the characters are determined depending on the transmission protocol. In the meantime, the micro processor can set an answer time necessary to receive the response to the ATR.

The TS has information selecting a synchronizing pattern for the synchronization and a code conversion rule. The code conversion rule has an inverse method and a direct method. In the case of using the inverse method, the A state on an I/O line is logically "1", and the bit to be transmitted next to the start bit is the MSB of characters. In the case of using the direct method, the Z state on the I/O line through the contact C7 is logically "1", and the bit to be transmitted next to the start bit is the LSB. For bit-synchronization, the pattern of first 4 bits (m1 through m4) is AZZA. The IC card includes the TS having any one of the following two values in the ATR and transmits the TS.

(Z)AZZAAAAAAZ—Inverse method, '3F'
(Z)AZZAZZZAAZ—Direct method, '3B'

The interface device must support both the inverse method and the direct method and receive only the ATR having '3F' or '3B.' Also, the interface device must not respond to the ATR having other values.

A format character (T0) consists of two parts, an Y(1) and K. The four most significant bits (Y(1), b5 through b8) indicates whether to provide interface characters of each one of TA1 through TD2. It is determined that the interface characters are provided if each bit is logically "1." The 4 most significant bits (K, b1 through b4) indicates the number of historical characters to be provided.

The Interface characters $TA_i$, $TB_i$, $TC_i$ and $TD_i$ are identified as global interface characters and specific interface characters. The global interface characters are related to the parameter of a specific transmission protocol provided by the card. TA1, TB1, TC1, TA2 and TB2 are the global interface characters, and TC2 is a specific character for T=0.

The analysis of $TA_i$, $TB_i$, and $TC_i$, i being 3 and more, depends on the value T of the $TD_{i-1}$. If T is not 15, these characters become the special interface characters related to T. If T is 15, these characters become the global interface characters. In order that at least three interface characters $TA_i$, $TB_i$, and $TC_i$ are used for the same value T, they must be successively designated to $TD_{i-1}$ and $TD_i$ having the same T.

The four upper bits (b8 through b5) of the $TD_i$ represent that there are $TD_{i+1}$, $TC_{i+1}$, $TB_{i+1}$, and $TA_{i+1}$. Each bit having logical "1" represents that there is pertinent information. The four lower bits (b4 through b1) of the $TD_i$ refer to a transmission protocol supported from T=0 to T=15. In the case of supporting at least two transmission protocols, the value T of the $TD_i$ must be determined based on the ascending power series. If there is the Value T having zero among supportable protocols, the T of the TD1 must be zero. However, the T having 15 for TD1 is not able to be used. If there is no TD1, only the transmission protocol supported at T=0 can be provided. Otherwise, the transmission protocol depends on the value T.

One embodiment of the present invention sets a protocol that can support the 4 lower bits of the $TD_i$. In other words, the 4 lower bits of the $TD_i$ refer to the value capable of identifying the high speed communication protocol that can be supported by the IC card. Any identifying value can be provided. For example, the MMC protocol can be indicated as 1000, and the USB protocol can be indicated as 1001.

The character TA1, which is the global interface character, represents a clock rate conversion factor F and a baud rate adjustment factor.

The character TB1, which is the global interface character, represents a maximum programming current II and a programming voltage PI1. The value of the TB1 of the ICC that does not request an external programming voltage is zero. In an embodiment of the present invention, since the contact C6 applied with the Vpp is used for the high speed communication, the IC card does not transmit the TB2.

The TC1 defines a parameter N. The parameter N is used as a variable for calculating the extra quardtime used when the interface device sends characters to the card. The reference value is zero.

The TA2, which is the global interface character, represents the property of the specific mode operation of the card. The most significant bit b8 having '0' means that it is possible to change a negotiable mode and a specific mode. The bit b8 having '1' means that it is impossible to change them. If the bit b6 is '0,' the parameters are determined depending on the interface character TA1. If the bit b6 is '1,' the parameters are determined as values defined according to the predetermined rule of the IC card.

The TB2, which refers to a programming voltage, is not used in embodiments of the present invention.

The TC2, which is a specific interface character for the transmission protocol in T=0, includes a variable WI necessary to calculate a work waiting time requested in the time section between the leading edge of a character, transmitted by the card, and the leading edge of another character, previously transmitted by the IC card or the interface device. The interface device must exceed the work waiting time.

The value of a check character (TCK) is determined such that the values performed with the exclusive-OR operation of all characters from T0 to TCK can be null. The value of the TCK in T=1 is also used for detecting an error. In the case of supporting the protocol in T=0, the TCK is not provided.

The transmission of the information related to the high speed communication protocol by use of the ATR can be carried out by the IC card a protocol and parameter selection (PPS) operation. The negotiation for changing the communication environment by the ISO 7816 protocol between the terminals or the IC cards, which do not support the high speed communication protocol, can be also performed through the PPS operation. The PPS operation refers to the operation for negotiating the protocol F and the parameter with the IC card supporting the transmission speed of 9600 baud or more. Since the PPS operation is not a must, some terminal can omit the PPS operation. The PPS operation consists of steps of receiving the normal ATR and then allowing the terminal to transmit a PPS request to the IC card and receiving the corresponding response from the IC card. In one embodiment of the present invention, the high speed communication protocol that can be supported by the IC card is set in the 4 lower bits of PPS0, PPS1, PPS2, PPS3 . . . received in response to the PPS request. In other words, the 4 lower bits of PPS0, PPS1, PPS2, and PPS3 refer to the values capable of identifying the high speed protocol that can be supported by the IC card.

As a result of analyzing the ATR, in case that the IC card does not support the high speed communication protocol, the terminal can change the communication environment (the protocol and the parameter) by performing the PPS operation.

In a step represented by 910, if the interface device determines that the IC card can be operated by using the high speed communication with reference to the 4 lower bits of the TD1, TD2, TD3, TD4 . . . or the PPS0, PPS1, PPS2, PPS3 . . . of the ATR, the interface device transmits to the IC card the request of changing the communication protocol having the high speed communication protocol that can be supported by the terminal. Here, the request of changing the communication protocol can further include information related to communication contacts to be used for the communication by the high speed communication protocol. If the terminal is unable to support the high speed communication protocol that is supported by the IC card, the interface device transmits an error signal to the IC card or does not transmit the request of changing the communication protocol in response to the ATR. Then, the connection between a contact port allotting unit and an IC card reader is maintained.

In a step represented by 915, the microprocessor of the IC card receives the request of changing the communication protocol and transmits a corresponding confirmation signal to the interface device. If the request of changing the communication protocol is received within a predetermined answer time, or the error signal is received, the connection between the contact port allotting unit and the IC card interface is maintained.

In steps represented by 920 and 925, the microprocessor of the IC card controls the contact allotting unit such that the communication contacts C6 and C7 can be connected to the card high speed interface in accordance with information related to the contacts. Then, the communication with the terminal is performed by using the high speed communication protocol. In the meantime, the interface device switches the contact ports corresponding to the communication contacts C6 and C7 among a plurality of contact ports, arranged on the locations corresponding to the contacts of the IC card, from the IC card reader to the terminal high speed interface.

In a step represented by 930, the IC card and the terminal can perform the communication with each other through the set communication contacts.

Figure 11:
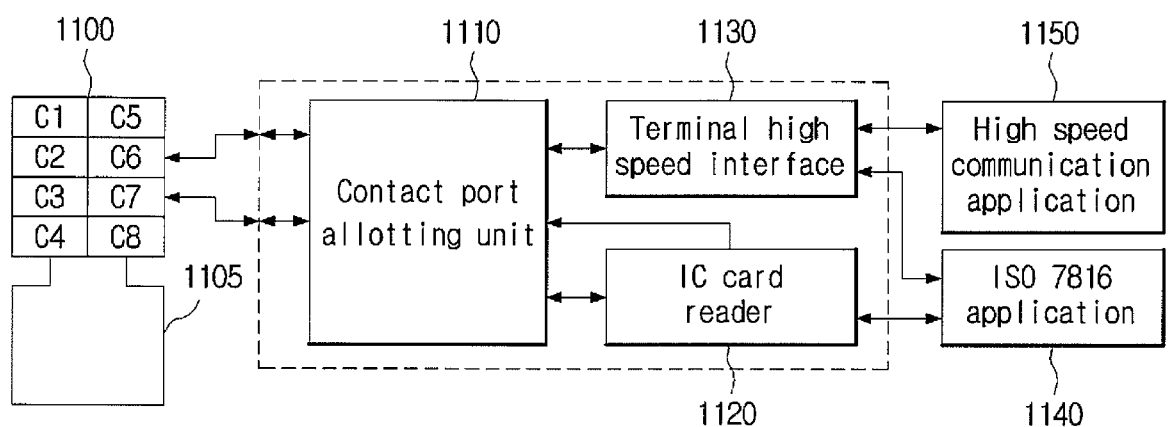
FIG. 11 is a block diagram illustrating an interface device in accordance with an embodiment of the present invention.

FIG. 11 is a block diagram illustrating the interface device in accordance with an embodiment of the present invention.

A plurality of contact ports 1100 are arranged on the locations corresponding to the contacts of an IC card. The contact ports, corresponding to the RF contacts C4 and C8 of the contact ports, are coupled to an RF antenna 1105. The contact ports, corresponding to communication contacts C6 and C7 of the contact ports, are coupled to a contact port allotting unit 1110.

The contact port allotting unit 1110 is coupled to an IC card reader 1120 and a terminal high speed interface 1130, respectively. The contact ports corresponding to communication contacts C6 and C7 are connected to any one of the terminal high speed interface 1130 and the IC card reader 1120. The contact port allotting unit 1110, before an initializing operation with the IC card, basically connects the contact ports corresponding to the communication contacts C6 and C7 to the IC card reader 1120. Accordingly, the initializing operation is performed by the IC card reader 1120.

The IC card reader 1120 performs the initializing operation. Then, the IC card reader 1120 converts the APDU, outputted from an ISO 7816 application 1140, into the TPDU and transmits the TPDU to the IC card. Also, the IC card reader 1120 converts the TPDU, received from the IC card, into the APDU and transfers the APDU to the ISO 7816 application 1140. In case that the IC card supports a high speed communication protocol through the initializing operation, the IC card reader 1120 controls the contact port allotting unit 1110 such that the contact ports corresponding to the communication contacts C6 and C7 can be connected to the terminal high speed interface 1130.

The terminal high speed interface 1130 supports the communication with use of the high speed communication protocol between the IC card and the terminal. In the communication by using the high speed communication protocol, the terminal high speed interface 1130 encapsulates the APDU, received from the ISO 7816 application 1140, to a token according to the high speed communication protocol and transmits the token to the IC card. Also, the terminal high speed interface 1130 decapsulates the token, received from the IC card, to the APDU and transfers the APDU to the ISO 7816 application 1140. In addition, the terminal high speed interface 1130 writes data in a built-in flash memory of the IC card or reads the data stored in the flash memory according to the command from the high speed communication application 1150. Here, the terminal high speed interface 1130 supports a USB 1.1/2.0 protocol or an MMC 3.31/4.1 protocol. Besides, it shall be evident that the terminal high speed interface 1130 can support variable high speed communication protocols in a serial format.

As described above, in accordance with at least one embodiment of the present invention, the IC card can maintain the contact arrangement according to the ISO 7816 standard, and at the same time, can support both contact high speed communication and contactless wireless communication. In addition, large capacity data storage using a flash memory mounted in the IC card is enabled.

Also, since the communication with a terminal for an operation indigenous to the IC card is performed by using the high speed communication protocol set through an initializing operation, it is not necessary that the connection between contacts is re-changed. The increase of the communication speed efficiency can be expected also.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. An integrated circuit (IC) card, comprising:
a memory;
a plurality of contacts comprising a pair of radio frequency (RF) contacts and a pair of communication contacts;
a microprocessor configured to i) select one of a low speed communication protocol and a high speed communication protocol, ii) have a command input through (a) one of the pair of communication contacts and (b) the RF contacts if the low speed communication protocol is selected, iii) have a command input through (a) the pair of communication contacts and (b) the RF contacts if the high speed communication protocol is selected, and iv) process data written in the memory by the input command and output a corresponding response;
a high speed interface configured to communicate the command and the response via the pair of communication contacts based on the high speed communication protocol;
a low speed interface configured to communicate the command and the response via one of the pair of communication contacts based on the low speed communication protocol; and
a contact allotting unit configured to electrically connect the communication contact determined by the selected communication protocol to one of the low speed interface and the high speed interface,
wherein the plurality of contacts are arranged so as to be compatible with ISO 7816, and wherein the RF contacts correspond to C4 and C8 contacts of ISO 7816, and wherein one of the pair of communication contacts correspond to the C7 contact of ISO 7816 in the low speed communication protocol, and wherein the pair of communication contacts correspond the C6 and C7 contacts of ISO 7816 in the high speed communication protocol.

2. The IC card of claim 1, wherein the high speed communication protocol is one of a universal serial bus (USB) communication protocol and a multimedia card (MMC) protocol.

3. The IC card of claim 1, wherein the high speed interface is further configured to encapsulate the response correlated to the low speed communication protocol to a data token, which is compatible with the high speed communication protocol.

4. The IC card of claim 1, wherein the high speed interface is further configured to decapsulate a data token, which is compatible with the high speed communication protocol, to the command correlated to the low speed communication protocol.

5. The IC card of claim 1, wherein the microprocessor is further configured to insert high speed communication protocol information supported in response to a reset signal (RST) into an answer to reset (ATR).

6. The IC card of claim 1, wherein the memory comprises a flash memory.

7. The IC card of claim 1, wherein the contact allotting unit is further configured to maintain a connection state corresponding to the low speed communication protocol in an initializing operation.

8. A terminal, comprising:
a radio frequency (RF) antenna;

an integrated circuit (IC) card comprising a plurality of contacts, wherein the plurality of contacts comprise a pair of RF contacts and a pair of communication contacts wherein the IC card is configured to i) support RF communication via the pair of RF contacts and selectively support a low speed communication protocol or a high speed communication protocol, ii) determine one of the pair of communication contacts for communication of data if the low speed communication protocol is selected, and iii) determine the pair of communication contacts for communication of data if the high speed communication protocol is selected; and an interface device configured to i) electrically connect the RF contacts and the RF antenna, and ii) communicate with the IC card via the determined communication contact, wherein the plurality of contacts are arranged so as to compatible with ISO 7816, and wherein the RF contacts correspond to C4 and C8 contacts of ISO 7816, and wherein one of the pair of communication contacts correspond to the C7 contact of ISO 7816 in the low speed communication protocol, and wherein the pair of communication contacts correspond the C6 and C7 contacts of ISO 7816 in the high speed communication protocol.

9. The terminal of claim 8, wherein the communication protocol is selected in an initializing operation between the IC card and the interface device.

10. The terminal of claim 8, wherein the high speed communication protocol is one of a universal serial bus (USB) communication protocol and a multimedia card (MMC) protocol.

11. A terminal, comprising:
a radio frequency (RF) antenna;
an integrated circuit (IC) card comprising a plurality of contact ports and a pair of RF contact ports, wherein the IC card is coupled to the RF antenna, and wherein a pair of communication contact ports corresponds to a pair of communication contacts of the IC card;
a low speed interface configured to communicate with the IC card via one of the pair of communication contact ports based on a low speed communication protocol;
a high speed interface configured to communicate with the IC card via the pair of communication contact ports based on a high speed communication protocol; and
a contact port allotting unit configured to electrically connect the at least one communication contact port to one of the low speed interface and the high speed interface according to the selected communication protocol,
wherein the plurality of contact ports are arranged so as to be compatible with ISO 7816, and wherein the RF contact ports correspond to C4 and C8 contacts of ISO 7816, and wherein one of the pair of communication contact ports correspond to the C6 and C7 contacts of ISO 7816 in the high speed communication protocol, and
wherein the IC card is configured to support RF communication via the RF contact ports, determine one of the pair of communication contacts for communication of data if the low speed communication protocol is selected, and determine the pair of communication contacts for communication of data if the high speed communication protocol is selected.

12. The terminal of claim 11, wherein the high speed interface is further configured to encapsulate a command to be transmitted to the IC card to a data token according to the high speed communication protocol.

13. The terminal of claim 11, wherein the high speed interface is further configured to decapsulate a data token, received by the high speed communication protocol, to a response, which is correlated to the low speed communication protocol.

14. The terminal of claim 11, wherein the contact port allotting unit is further configured to maintain a connection state corresponding to the low speed communication protocol in an initializing operation.

15. The terminal of claim 11, wherein the low speed interface is further configured to check whether the IC card supports the high speed protocol, in an answer to reset (AIR) received in response to a reset signal (RST).

16. The terminal of claim 15, wherein the low speed interface is further configured to check whether the IC card supports the high speed protocol, in an answer to reset (ATR) received in response to a reset signal (RST).

17. The terminal of claim 11, wherein the high speed communication protocol is operated by one of a universal serial bus (USB) communication protocol and a multimedia card (MMC) protocol.

18. An initializing method of an integrated circuit (IC) card, the method comprising:
providing an IC card which comprises a low speed interface and a high speed interface, wherein the low speed interface communicates with a terminal based on a low speed communication protocol, and wherein the high speed interface communicates with the terminal based on a high speed communication protocol;
receiving a reset signal (RST) from the terminal via the low speed interface;
incorporating high speed communication protocol information into an answer to reset (ATR), wherein the high speed communication protocol information is supported by the IC card via the low speed interface;
transmitting the ATR to the terminal; and
electrically connecting the communication contact to one of the low speed interface and the high speed interface based on the response to the ATR,
wherein the IC card comprises a plurality of contacts, wherein the plurality of contacts comprise a pair of RF contacts and a pair of communication contacts, and wherein the RF contacts ports correspond to C4 and C8 contacts of ISO 7816 in the low speed communication protocol, wherein the pair of communication contacts corresponds to the C6 and C7 contacts of ISO 7816 in the high speed communication protocol, and
wherein the IC card is configured to support RF communication via the RF contacts, determine one of the pair of communication contacts for communication of data if the low speed communication protocol is selected, and determine the pair of communication contacts for communication of data if the high speed communication protocol is selected.

19. The method of claim 18, wherein the response to the ATR, from the terminal, comprises high speed communication protocol information supported by the terminal.

20. The method of claim 18, further comprising;
setting an answer time for the ATR; and
maintaining the connection between the low speed interface and the communication contact if the answer time is exceeded.

21. The method of claim 18, wherein the high speed communication information supported by the IC card is inserted into the lower bit of a TD; interface character of the ATR.

22. The method of claim 18, wherein the high speed communication protocol is one of a universal serial bus (USB) communication protocol and a multimedia card (MMC) protocol.

23. An initializing method of a terminal, the method comprising:
- transmitting a reset signal (RST) to an IC card via a low speed interface, wherein the IC card comprises the low speed interface and a high speed interface, wherein the low speed interface communicates with the terminal based on a low speed communication protocol, and wherein the high speed interface communicates with the terminal based on a high speed communication protocol;
- extracting high speed communication protocol information supported by the IC card in an answer to reset (ATR) received via the low speed interface; and
- electrically connecting the communication contact to one of the low speed interface and the high speed interface based on a response to the request of changing the communication protocol,
- wherein the IC card comprises a plurality of contacts, wherein the plurality of contacts comprise a pair of RF contacts and a pair of communication contacts, and wherein the RF contacts ports correspond to C4 and C8 contacts of ISO 7816 in the low speed communication protocol, wherein the pair of communication contacts corresponds to the C6 and C7 contacts of ISO 7816 in the high speed communication protocol, and
- wherein the IC card is configured to support RF communication via the RF contacts, determine on of the pair of communication contacts for communication of data if the low speed communication protocol is selected, and determine the pair of communication contacts for communication of data if the high speed communication protocol is selected.

24. The method of claim 23, wherein the high speed communication protocol is one of a universal serial bus (USB) communication protocol and a multimedia card (MMC) protocol.

25. The method of claim 23, wherein the initializing operation is performed by the low speed communication protocol.

26. The method of claim 23, wherein the high speed communication protocol information supported by the IC card is inserted into the lower bit of a $TD_i$ interface character of the ATR.

27. The method of claim 23, wherein the request of changing the communication protocol further comprises information related to communication contacts to be used for communication by the high speed communication protocol.

28. An initializing apparatus for an integrated circuit (IC) card, the apparatus comprising:
- means for receiving a reset signal (RST) from a terminal via a low speed interface, wherein the IC card comprises a low speed interface and a high speed interface, wherein the low speed interface communicates with the terminal based on a low speed communication protocol, and wherein the high speed interface communicates with the terminal based on a high speed communication protocol;
- means for incorporating high speed communication protocol information into an answer to reset (ATR), wherein the high speed communication protocol information is supported by the IC card via the low speed interface;
- means for transmitting the ATR to the terminal; and
- means for electrically connecting the communication contact to one of the low speed interface and the high speed interface based on the response to the ATR,
- wherein the IC card comprises a plurality of contacts, wherein the plurality of contacts comprise a pair of RF contacts and a pair of communication contacts, wherein the plurality of contacts are arranged so as to be compatible with ISO 7816, wherein one of the pair of communication contacts corresponds to the C7 contact of ISO 7816 in the low speed communication protocol, wherein the paid of communication contacts corresponds to the C6 and C7 contacts of ISO 7816 in the high speed communication protocol, and wherein the IC card is configured to support RF communication via the RF contacts, determine one of the pair of communication contacts for communication of data if the low speed communication protocol is selected, and determine the pair of communication contacts for communication of data if the high speed communication protocol is selected.

* * * * *